United States Patent [19]
Hoekstra

[11] Patent Number: 5,861,976
[45] Date of Patent: Jan. 19, 1999

[54] AT LEAST PENTA-LAYERED OPTICAL DEVICE

[75] Inventor: Tsjerk Hans Hoekstra, Dieren, Netherlands

[73] Assignee: Akzo Nobel NV, Arnhem, Netherlands

[21] Appl. No.: 990,331

[22] Filed: Dec. 15, 1997

Related U.S. Application Data

[63] Continuation of PCT/EP96/02500 Jun. 7, 1996.

[30] Foreign Application Priority Data

Jun. 28, 1995 [EP] European Pat. Off. .............. 95201762

[51] Int. Cl.$^6$ ........................................................ G02F 1/01
[52] U.S. Cl. .......................... 359/288; 359/320; 385/126; 385/131
[58] Field of Search ..................................... 359/288, 320; 385/126, 131, 49

[56] References Cited

U.S. PATENT DOCUMENTS

| | | | |
|---|---|---|---|
| 4,985,528 | 1/1991 | Mignani et al. | 528/59 |
| 5,113,471 | 5/1992 | Inaishi et al. | 385/126 |
| 5,249,245 | 9/1993 | Lebby et al. | 385/126 |
| 5,633,966 | 5/1997 | Nakaishi | 385/131 |

FOREIGN PATENT DOCUMENTS

| | | | |
|---|---|---|---|
| 194 639 | 9/1986 | European Pat. Off. | G02B 6/12 |
| 350 112 | 1/1990 | European Pat. Off. | C08G 18/67 |
| 350 113 | 1/1990 | European Pat. Off. | C08G 63/68 |
| 358 476 | 3/1990 | European Pat. Off. | G03F 7/00 |
| 359 648 | 3/1990 | European Pat. Off. | C08G 18/38 |
| 370 922 | 5/1990 | European Pat. Off. | G02F 1/35 |
| 378 185 | 7/1990 | European Pat. Off. | C08F 20/36 |
| 445 864 | 9/1991 | European Pat. Off. | C08G 18/00 |
| 642 052 | 3/1995 | European Pat. Off. | G02F 1/29 |
| 645 413 | 3/1995 | European Pat. Off. | C08G 64/16 |
| WO 94/20870 | 9/1994 | WIPO | G02B 6/18 |
| WO 96/28493 | 9/1996 | WIPO | C08G 64/16 |

OTHER PUBLICATIONS

Ashley, et al., "Channel waveguide in electro-optic polymers using a photopolymer cladding technique", vol. 58, *Appl. Phys. Lett.,* 884–886 (Mar. 1991).

Chon, et al., "Laser ablation of nonlinear-optical polymers to define low-loss optical channel waveguides", vol. 19, *Optics Letters,* 1840–1842 (Nov. 1994).

Van Tomme, et al., "Integrated Optic Devices Based on Nonlinear Optical Polymers", vol. 27, *Journal of Quantum Electronics,* 778–787 (Mar. 1991).

*Primary Examiner*—Loha Ben
*Attorney, Agent, or Firm*—Loretta A. Miraglia; Louis A. Morris

[57] ABSTRACT

The present invention is in the field of optical components, more particularly, polymeric optical components, even more particularly, thermo-optical components, electro-optical components or passive components. The present invention pertains to an optical component having an at least penta-layered polymer structure on a substrate comprising:

A) a low refractive index lower cladding layer,

B) a core-matching refractive index lower cladding layer,

C) a core layer,

D) a core-matching refractive index upper cladding layer, and

E) a low refractive index upper cladding layer.

With this specific layer structure an optimum traversal confinement can be obtained, which results in less loss of light and an improved switching efficiency.

14 Claims, No Drawings

5,861,976

AT LEAST PENTA-LAYERED OPTICAL DEVICE

CROSS REFERENCE TO RELATED APPLICATION

This is a continuation of International Application PCT/EP96/02500 with an international filing date of Jun. 7, 1996.

FIELD OF THE INVENTION

The present invention is in the field of optical components, more particularly, polymeric optical components. By optical components are meant here, thermo-optical components, electro-optical components or passive components.

BACKGROUND OF THE INVENTION

Both thermo-optical and electro-optical components are known. The working of thermo-optical components is based on the phenomenon of the optical waveguide material employed exhibiting a temperature dependent refractive index. Polymeric thermo-optical components generally comprise a polymeric three-layer structure on a substrate. The three-layer structure comprises a low refractive index lower cladding layer, a high refractive index core layer, and a low refractive index upper cladding layer. On top of the upper cladding layer heating elements are provided (usually metal strips) to heat the polymeric cladding material, in order to change the refractive index for switching. The working of electro-optical devices is based on the phenomenon of the non-linear optically active material employed exhibiting an electric field dependent refractive index. Polymeric electro-optical components in general also comprise a polymeric three-layer structure. The three-layer structure comprises a low refractive index lower cladding layer, a non-linear optically active, high refractive index core layer, and a low refractive index upper cladding layer. On top of the upper cladding layer electrodes are provided to apply an electric field to the non-linear optically active material to change the refractive index for switching.

U.S. Pat. No. 5,113,471 discloses a three layered structure as described above, which is additionally provided with a reinforcing layer on both sides.

EP 642 052 claims a polymeric thermo-optic device comprising a polymeric guiding layer sandwiched between two cladding layers of lower refractive index than the guiding layer, wherein the upper cladding layer (carrying the heating element) has a lower refractive index than the lower cladding layer (contacting the substrate to which the three layered structure is attached).

The known optical components still suffer from extensive light loss; moreover, in the thermo-optical components the switching speed is not optimal, while in the electro-optical components the switching efficiency leaves much to be desired.

The present invention alleviates these problems.

SUMMARY OF THE INVENTION

To this end the present invention pertains to an optical component having an at least penta-layered polymer structure on a substrate comprising:

A) a low refractive index lower cladding layer,
B) a core-matching refractive index lower cladding layer,
C) a core layer,
D) a core-matching refractive index upper cladding layer, and
E) a low refractive index upper cladding layer.

With this specific layer structure optimum traversal confinement can be obtained, which results in less loss of light and an improved switching efficiency.

DETAILED DESCRIPTION OF THE INVENTION

For optical components preferably silicon substrates are used. These substrates are readily available on the market and are of homogeneous thickness. Furthermore, they are frequently used in integrated circuit techniques and apparatus. One disadvantage of silicon is its high refractive index. Due to this high refractive index the light of the propagating mode might leak into the silicon substrate. The low refractive index lower cladding layer A is applied to prevent leaking of light from the propagating mode into the silicon substrate. When other substrates are used, the low refractive index lower cladding A is also of advantage in controlling the confinement of the propagating mode. Using a low refractive index lower cladding A of appropriate index and thickness gives ample freedom in designing the core-matching refractive index cladding layers B and D and the core layer C.

As described above, the optical components usually comprise metal electrodes on top of the upper cladding layer, either for use as heating elements or for applying an electric field. These electrodes are usually made of gold and/or other metals such as chromium, copper, platinum or combinations or alloys thereof. The low refractive index upper cladding E is applied to prevent leading of the light from the propagating mode into the attenuating (gold) electrodes. The refractive indices of the low refractive index lower and upper cladding layers A and E are usually (approximately) the same. Employing a low refractive index upper cladding layer E with a larger thickness than that of the low refractive index lower cladding layer A makes it possible to use a core-matching refractive index upper cladding layer D which is thinner than the core-matching refractive index lower cladding B. In this case the resulting combined thickness of the low refractive index upper cladding E and the core-matching refractive index upper cladding D is smaller than the combined thickness of the low refractive index lower cladding A and the core-matching refractive index lower cladding B. As a consequence, the structure is transversally asymmetric, with the core layer being close to the electrodes and thus experiencing stronger induced thermo-optical or electro-optical effects, resulting in a more efficient component.

The invention is also directed to an optical component wherein the low refractive index upper cladding layer E is thicker than the low refractive index lower cladding layer A.

The core-matching refractive index lower cladding B and the core-matching refractive index upper cladding D are applied to obtain transversal confinement of the propagating mode. The refractive index can be chosen in a relatively wide range to achieve the required properties, such as: monomode behavior, good overlap with a Standard Single Mode Fibre (SMF).

Lateral confinement can be achieved by all known methods for defining channels in planar waveguiding components. Suitable methods are:

1. Shaping the core layer by etching techniques (for instance reactive ion etching with oxygen plasma) to obtain a buried channel waveguide, 2. Bleaching of the core layer to obtain a buried channel waveguide, 3. Shaping of either of the core-matching refractive index upper and lower cladding layers B and D to obtain a ridge (strip loaded) or an inverted ridge waveguide, 4. Bleaching of either of the core-matching refractive index upper and lower cladding layers B and D to obtain a ridge (strip loaded) or an inverted ridge waveguide.

All these techniques are known to the artisan and need no further elucidation here. When using technique 1, the core layer is etched away, leaving only the channel waveguide. Subsequently, core-matching refractive index upper cladding material is applied both on top of the core layer C and onto the areas where the core material was etched away. This technique and also technique 2 are preferred because they can result in symmetrical channel waveguides. Symmetrical channel waveguides show low polarization dependence of the modal properties. When the bleaching technique is used, the refractive index of the core-matching refractive index cladding layers B and D should be adapted to the refractive index of the bleached parts of the core. When the shaping of the core technique is used, the refractive index of the core-matching refractive index upper cladding layer material is chosen such as to give the required properties, such as: monomode behavior, good overlap with a Standard Single Mode Fiber (SMF), polarization dependence, low bend losses.

The polymers used for thermo-optical devices according to the invention are so-called optical polymers. Optical polymers are known, and the person skilled in the art is able to choose polymers having the appropriate refractive indices, or to adapt the refractive indices of polymers by chemical modification, e.g., by introducing monomeric units that affect the refractive index. For instance, the refractive indices of the various layers can be set by varying the amount of fluorine atoms and bromine atoms in the monomers of the polymeric material used for the various layers. The amount of fluorine atoms is increased to lower the refractive index, while the amount of bromine atoms is increased to obtain a higher refractive index. It is known to the artisan which other groups can be used to increase or decrease the refractive index. Examples of suitable groups to increase the refractive index are dihydroxyphenyl diphenylmethane bisfenol S, 2,2-bis(4-hydroxy-3,5-dibromophenyl)-1,1,1,3,3,3,-hexafluoropropane, phenolphtalein, tetrabromo phenolphtalein, 2,2-bis(4-hydroxy-3,5-dichlorophenyl)-1,1,1,3,3,3-hexafluoropropane, tetrachloro phenolphtalein, and bischloroformates thereof. Examples of suitable groups to decrease the refractive index are 2,2-bis(4-hydroxyphenyl)-1,1,1,3,3,3-hexafluoropropane, octafluorodihydroxybiphenyl, 1,4-bis(2-hydroxyhexafluorisopropyl)benzene,2,2,3,3,4,4,5,5-octafluorohexane 1,6 diol, 2,2,3,3,4,4,5,5,6,6,7,7-dodecafluoro 1,8 diol, 1H,1H,1OH,1OH-perfluorodecane 1,10 diol. As all polymers exhibit a thermo-optical effect, basically any polymer having sufficient transparency for the wavelength used can be employed as the core layer material. Said transparency requirement also holds for the cladding layers, albeit that the refractive indices have to be adapted to the refractive index of the core layer. Particularly suitable optical polymers include polyarylates, polycarbonates, polyimides, polyureas, polyacrylates.

The polymers suitable for use as core layer material in electro-optical components are non-linear optically active polymers. These types of polymers are also known. In these types of polymers non-linear polarization occurs under the influence of an external field of force (such as an electric field). Non-linear electric polarization may give rise to several optically non-linear phenomena, such as frequency doubling, Pockels effect, and Kerr effect. In order to render polymeric non-linear optical material active (obtain the desired NLO effect macroscopically), the groups present in the polymer, usually hyperpolarizable sidegroups, first have to be aligned (poled). Such alignment is commonly effected by exposing the polymeric material to electric (DC) voltage, the so-called poling field, with such heating as will render the polymeric chains sufficiently mobile for orientation. NLO polymers are described in, int. Al., EP 350 112, EP 350 113, EP 358 476, EP 445 864, EP 378 185, EP 359 648, EP 645 413, and EP application No. 9500598.1. For the cladding layers the same material can be used as in thermo-optical components.

The various layers can be applied by spincoating. In order to be able to spincoat layer-on-layer, it is often necessary to cross-link one layer before applying the next layer. Therefore, the optical polymers or NLO polymers are preferably rendered cross-linkable either by the incorporation of cross-linkable monomers or by mixing cross-linkers such as polyisocyanates, polyepoxides, etc. Into the polymer.

In order to enhance the stability of the thermo-optical components oxygen scavengers and radical scavengers and the like may be added to the optical polymers.

Typical layer thicknesses and typical refractive indices of the various layers are given below in TABLE I.

TABLE I

| layer | thickness ($\mu$m) | refractive index |
| --- | --- | --- |
| E | 4–8 | 1.4–148 |
| D | up to 4 | 1.50–1.52 |
| C | 4–8 | 1.51–1.525 |
| B | 6–8 | 1.50–1.52 |
| A | 2–4 | 1.4–1.48 |

The invention is further illustrated by the following unlimitative examples.

EXAMPLES

Example 1

A low refractive index cladding material was made by polymerizing 50 mole % of bischloroformate of 2,2-bis(4-hydroxyphenyl)-1,1,1,3,3,3-hexafluoropropane, 25 mole % of 2,2-bis(4-hydroxyphenyl)-1,1,1,3,3,3-hexafluoropropane and 25 mole % of 2,3-didhydroxypropyl-methacrylate. This material was used for both low refractive index cladding layers A and E.

A matching refractive index cladding material is made by polymerizing 25 mole % of 2,3-dihydroxypropyl-methacrylate, 40 mole % of bischloroformate propane, 25 mole % of 2,2-bis(4-hydroxyphenyl)-1,1,1,3,3,3-hexafluoropropane and 10 mole % of bischloroformate of 2,2-bis(4-hydroxyphenyl)-1,1,1,3,3,3-hexafluoropropane. This material was used for both matching refractive index cladding layers B and D.

A core layer was prepared by polymerizing 25 mole % of 2,3-dihydroxypropyl-methacrylate, 50 mole % of bischloroformate of 2,2-bis(4-hydroxy-3,5-dibromophenyl) -1,1,1,3,3,3-hexafluoro-propane, and 25 mole % of 2,2-bis(4-hydroxyphenyl)-1,1,1,3,3,3-hexafluoropropane.

A thermo-optical component was prepared by spincoating the various layers on a silicon substrate. The channels were defined by reactive ion etching with oxygen plasma. On top of the upper cladding layer a heater strip made up of a thin Cr-layer and an Au-layer was applied, provided with 3–5 $\mu$m thick bonding pads. The thermo-optical component was pigtailed with Standard Single Mode Fibers. The properties of the various layers are depicted in the TABLE.

| Layer | thickness (μm) | refractive index at 1305 nm | (TE) at 1565 nm |
|---|---|---|---|
| A | 4.18 | 1.4877 | 1.4861 |
| B | 3.91 | 1.5092 | 1.5074 |
| C | 3.70 | 1.5147 | 1.5131 |
| D | 3.90 | 1.5092 | 1.5074 |
| E | 4.20 | 1.4877 | 1.4861 |

The thermo-optical component appeared to have a low insertion loss of less than 2 dB, a switching power of less than 100 mW, a cross-talk of −20 dB. The switching time was as low as 1 ms and the polarization dependence less than 0.3 dB.

What is claimed is:

1. An optical component having an at least penta-layered polymer structure on a substrate comprising:
   a low refractive index lower cladding layer,
   a core-matching refractive index lower cladding layer,
   a high refractive index core layer,
   a core-matching refractive index upper cladding layer, and
   a low refractive index upper cladding layer.

2. The optical component of claim 1 wherein the optical component is a thermo-optical component.

3. The thermo-optical component of claim 2 wherein the substrate is made of silicon.

4. The thermo-optical component of claim 3, wherein the low refractive index upper cladding layer has a higher thickness than the low refractive index lower cladding layer.

5. The thermo-optical component of claim 4 wherein the core layer is laterally shaped by etching techniques, and the material of the core-matching refractive index upper cladding layer has been applied both on top of the core layer and adjacent to the shaped core.

6. The thermo-optical component of claim 4 wherein the core layer is laterally shaped by bleaching the core material.

7. The thermo-optical component of claim 3 wherein the core layer is laterally shaped by etching techniques, and the material of the core-matching refractive index upper cladding layer has been applied both on top of the core layer and adjacent to the shaped core.

8. The thermo-optical component of claim 3 wherein the core layer is laterally shaped by bleaching the core material.

9. The thermo-optical component of claim 2 wherein the low refractive index upper cladding layer has a higher thickness than the low refractive index lower cladding layer.

10. The thermo-optical component of claim 9 wherein the core layer is laterally shaped by etching techniques, and the material of the core-matching refractive index upper cladding layer has been applied both on top of the core layer and adjacent to the shaped core.

11. The thermo-optical component of claim 9 wherein the core layer is laterally shaped by bleaching the core material.

12. The thermo-optical component of claim 2 wherein the core layer is laterally shaped by etching techniques, and the material of the core-matching refractive index upper cladding layer has been applied both on top of the core layer and adjacent to the shaped core.

13. The thermo-optical component of claim 2 wherein the core layer is laterally shaped by bleaching the core material.

14. The optical component of claim 1 wherein the optical component is an electro-optical component.

* * * * *